Jan. 6, 1953            C. L. SUNKEL            2,624,277
METHOD OF APPLYING DECORATION AND INDICIA TO EDIBLE FOODS
Filed Aug. 22, 1950
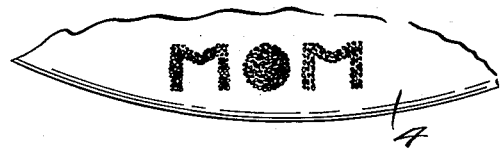
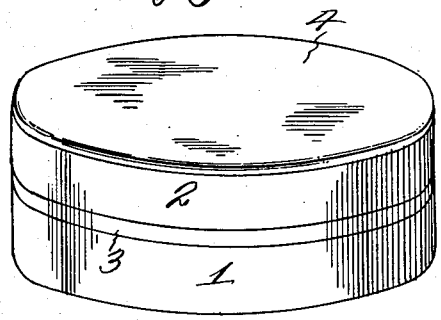
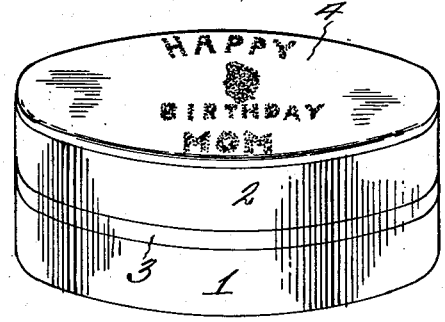
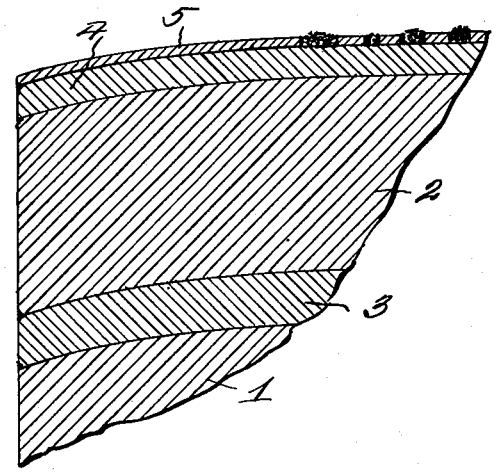
Inventor
Carl L. Sunkel
By Philip A. H. Terrell
Attorney Patented Jan. 6, 1953

2,624,277

UNITED STATES PATENT OFFICE 2,624,277

METHOD OF APPLYING DECORATION AND INDICIA TO EDIBLE FOODS

Carl L. Sunkel, Baltimore, Md.

Application August 22, 1950, Serial No. 180,784

1 Claim. (Cl. 101—129)

The invention relates to methods of applying decoration and indicia to foods, particularly cakes, by using a stencil having the desired decoration or indicia thereon.

A further object is to provide a method whereby the icing of a cake may be decorated by placing a stencil on the cake, which stencil has the desired cutout design, then filling the cutout design of the stencil with a powdered edible material, preferably cocoa in powdered form, and the powdered material contrasting color to the cake icing, then blowing off the excess cocoa from the stencil, after refrigeration, to harden the tacky icing, and finally stripping the stencil from the cake, leaving the design on the cake.

A further object is to form the icing with sufficient shortening whereby the icing will be tacky so the stencil will stick to the icing around the design outline, and these portions are slightly pressed so the design will be sharp and the powdered cocoa will not work under the design edges during the dusting of the powder on the stencil or when blowing the excess off the stencil.

A further object is to form the stencil from a slightly absorbent paper so the sticky or tacky icing will readily adhere to the paper around the design so that a sharp design outline is obtained.

In the drawing:

Figure 1 is a perspective view of the stencil.

Figure 2 is a perspective view of a conventional form of party cake having icing thereon.

Figure 3 is a perspective view of the cake after the stencilling operation, and after the stencil has been removed.

Figure 4 is a fragmentary plan view of one side of the cake showing a portion of the indicia on a large scale.

Figure 5 is a vertical transverse sectional view through one side of the cake showing some of the indicia in section as well as a portion of the stencil.

Referring to the drawing, for purposes of illustration, the cake is shown formed from two cake layers 1 and 2, having a filler layer 3 between, which may be of any composition desired. Covering the upper layer 2 is the icing 4, which icing is to be decorated. This icing is preferably formed from considerable shortening, preferably twenty-five to ninety per cent. This range has been found particularly desirable for getting the proper degree of tackiness so that the stencil will adhere. Good results are also obtained from seventy-five per cent sugar and twenty-five per cent shortening. This last mentioned proportion depends on the type of icing used. Usually the best results are obtained from seventy-five per cent sugar and twenty-five per cent shortening, as set forth above.

The stencil 5 is preferably formed from an absorbent paper to which paper the tacky icing will easily adhere when the stencil is placed on the icing, and at which time the operator gently presses the stencil around the indicia, so that during the following powdering operation, none of the powder, such as cocoa, will pass under the edges of the stencil, which would cause a smeary design. After the stencil has been placed on the icing of the cake, as above outlined, the indicia is powdered with cocoa, preferably through a sifter; following this, the cake, with the stencil thereon, is placed in a refrigerator for hardening the icing. It is not absolutely necessary to refrigerate cakes for all types of icings. Good results can be obtained without refrigeration, but the best results are usually obtained with refrigeration. Following the hardening operation, the cake is removed from the refrigerator and the excess powdered cocoa is blown from the cake; the operator then peels the stencil from the top of the cake. When removing the stencil care should be taken to always strip the stencil from the cake in one direction, so that any excess powdered cocoa will not get on the icing, and at the same time, slender pieces of the stencil, which may be part of some designs, will not tear from the stencil. The direction of stripping will be obvious, according to the design.

The method has been described in connection with cake decoration, however other edible products may be similarly decorated, which products contain surfaces suitable for a stencilling operation, even where a shortening is not used. It will be noted that the cocoa, is in powdered form, is partially absorbent, hence the tacky icing will be partially absorbed therein, therefore it will be seen that a great number of the particles will adhere to each other and to the icing, giving a slightly embossed effect, shown in exaggerated form in Figure 5.

Heretofore decoration of edible products has been accomplished with decorating tubes, and naturally outlines involving sharp lines, or silhouettes, as shown in the drawing is impossible, as the decoration is confined to the decorating tube and the flowing consistency of the icing used. The use of tubes is more or less confined to skilled operators, whereas with applicant's method the decoration can be accomplished by the housewife without any special skill.

When placing the stencil on the icing, it has been found that in a few minutes the absorbent stencil becomes limp and adheres to the tacky icing incident to the moisture in the icing, therefore it will only be necessary to run the finger around the outline of the indicia, however any portions of the stencil not properly touching or adhering to the tacky icing will appear lighter than those portions which are touching and have absorbed moisture from the icing incident to the shortening in the icing. Any pressing should be gentle to avoid pressing the icing over the design edges of the stencil, as it is obvious the design will be injured if this happens when the stencil is removed.

Cocoa has been described as the dusting agent however any other edible material can be used, for instance sugar, flour, powdered milk, corn starch or a combination of either and in various colors. Cocoa gives a contrast to many icings. Good results have been obtained with various food products and ice cream can be ornamented with the stencilling method.

The invention having been set forth what is claimed as new and useful is:

A method of decorating an edible product having a tacky surface, said method comprising placing on said tacky surface an absorbent stencil having the desired design outlined therethrough, then allowing moisture from the tacky surface to penetrate the absorbent stencil, next gently pressing those portions of the stencil outlining the design against the tacky surface, then applying a powdered material to the tacky surface through the design of the stencil, hardening the tacky surface, removing the excess powered material not adhering to the tacky surface and finally stripping the stencil from the hardened tacky surface.

CARL L. SUNKEL.

REFERENCES CITED

The following references are of record in the file of this patent:

UNITED STATES PATENTS

| Number | Name | Date |
|---|---|---|
| 1,627,630 | Carter | May 10, 1927 |
| 1,724,206 | Krick | Aug. 13, 1929 |
| 1,781,209 | Barbera | Nov. 11, 1930 |

FOREIGN PATENTS

| Number | Country | Date |
|---|---|---|
| 21,064 of 1935 | Australia | Jan. 24, 1935 |